United States Patent
Adachi et al.

(10) Patent No.: US 9,316,415 B2
(45) Date of Patent: Apr. 19, 2016

(54) FILM MIRROR, PRODUCTION PROCESS OF SAME AND REFLECTION DEVICE FOR SOLAR POWER GENERATION COMPRISING SAME

(75) Inventors: Hitoshi Adachi, Kanagawa (JP); Yayoi Eguro, Tokyo (JP)

(73) Assignee: KONICA MINOLTA ADVANCED LAYERS, INC., Tokyo (JP)

( * ) Notice: Subject to any disclaimer, the term of this patent is extended or adjusted under 35 U.S.C. 154(b) by 759 days.

(21) Appl. No.: 13/517,014

(22) PCT Filed: Dec. 13, 2010

(86) PCT No.: PCT/JP2010/072345
§ 371 (c)(1),
(2), (4) Date: Jun. 18, 2012

(87) PCT Pub. No.: WO2011/077982
PCT Pub. Date: Jun. 30, 2011

(65) Prior Publication Data
US 2012/0257274 A1    Oct. 11, 2012

(30) Foreign Application Priority Data

Dec. 21, 2009 (JP) .................... 2009-288775
Dec. 21, 2009 (JP) .................... 2009-288778

(51) Int. Cl.
| G02B 5/26 | (2006.01) |
| F24J 2/10 | (2006.01) |
| G02B 5/08 | (2006.01) |

(52) U.S. Cl.
CPC .............. *F24J 2/1052* (2013.01); *F24J 2/1057* (2013.01); *G02B 5/085* (2013.01); *G02B 5/0808* (2013.01); *Y02E 10/40* (2013.01)

(58) Field of Classification Search
None
See application file for complete search history.

(56) References Cited

U.S. PATENT DOCUMENTS

| 4,226,910 | A | * | 10/1980 | Dahlen et al. ................ 428/336 |
| 4,645,714 | A | * | 2/1987 | Roche et al. ................ 428/458 |
| 5,118,540 | A | * | 6/1992 | Hutchison ................ 428/40.7 |
| 6,030,671 | A | * | 2/2000 | Yang et al. ................ 428/34 |
| 6,166,322 | A | * | 12/2000 | Chen et al. ................ 136/251 |
| 6,203,162 | B1 | * | 3/2001 | Yamashita .......... H04N 9/3141 348/E9.027 |
| 6,989,924 | B1 | * | 1/2006 | Jorgensen et al. ............ 359/361 |
| 7,697,205 | B2 | * | 4/2010 | Noguchi ................ G02B 1/118 359/580 |
| 2005/0159514 | A1 | * | 7/2005 | McMan et al. .............. 524/86 |
| 2006/0181765 | A1 |   | 8/2006 | Jorgensen |

FOREIGN PATENT DOCUMENTS

| JP | 61-154942 | 7/1986 |
| JP | 06-038860 | 2/1994 |
| JP | 2001-305321 | 10/2001 |
| JP | 2002-122717 | 4/2002 |
| JP | 2002-154179 | 5/2002 |
| JP | 2005-059382 | 3/2005 |
| WO | WO 0066675 A1 * | 11/2000 |

OTHER PUBLICATIONS

Japanese Office Action, Notification of Reasons for Refusal, Patent Application No. JP2011-547478, Date mailed: Jul. 1, 2014 (2 pages).
English translation of Japanese Office Action, Notification of Reasons for Refusal, Patent Application No. JP2011-547478, Date mailed: Jul. 1, 2014 (3 pages).

* cited by examiner

*Primary Examiner* — Derek S Chapel
(74) *Attorney, Agent, or Firm* — Lucas & Mercanti, LLP

(57) ABSTRACT

There are disclosed a film mirror, which can be prevented from decrease in specular reflectance when a silver layer that serves as a reflective layer is deteriorated, is lightweight and flexible, can be produced at low cost, can have an enlarged surface area, can be produced on a large scale, exhibits excellent light stability and weather resistance, and exhibits good specular reflectance to solar light; a process for producing the film mirror; and a reflection device for solar power generation, which is equipped with such a film mirror. The film mirror comprises at least an adhesive layer, a silver reflection layer and an upper adjacent layer as constituent layers provided on the resin substrate sequentially in this order, in which at least the upper adjacent layer contains a binder and a corrosion inhibitor for silver.

12 Claims, No Drawings

FILM MIRROR, PRODUCTION PROCESS OF SAME AND REFLECTION DEVICE FOR SOLAR POWER GENERATION COMPRISING SAME

CROSS REFERENCE TO RELATED APPLICATION

This Application is a 371 of PCT/JP2010/072345 filed on Dec. 13, 2010 which, in turn, claimed the priority of Japanese Patent Application Nos. 2009-288775 filed on Dec. 21, 2009 and JP2009-288778 filed Dec. 21, 2009, all three applications are incorporated by reference herein.

TECHNICAL FIELD

The present invention relates to a film mirror which is excellent in light stability and weather resistance and exhibits good specular reflectance to solar light, a production process of the same and a reflection device for solar power generation by use of the same.

TECHNICAL BACKGROUND

In recent years, there have been studied natural energy such as coal energy, biomass energy, nuclear energy or natural energy of wind power energy, solar energy or the like, in place of fossil fuels such as petroleum, natural gas or the like, and the natural energy which is most stable as alternative energy for fossil fuels and in a large amount is considered to be solar energy.

However, although solar energy is very important alternative energy, it supposedly becomes a problem that (1) the energy density of solar energy is low and (2) storage and transfer of solar energy are difficult.

On the other hand, it was proposed that the problem of density of solar energy being low was overcome by collecting solar energy by giant reflection devices.

There was conventionally used a glass mirror as a reflection device since it was exposed to ultraviolet rays or heat of solar light, weather, sandstorms or the like. Such glass mirrors are high in environmental durability, however they are easily broken at the time of transportation or heavy in mass, which necessitates to enhance the strength of a rack to install the mirror, producing problems such that the solar plant construction cost increases.

To overcome the foregoing problems, it was proposed to replace a glass mirror by a resin reflection sheet (as described in, for example, patent document 1). However, such a resin is weak to the external environment and when a metal such as silver is used in a reflection layer, oxygen, moisture or hydrogen sulfide transmits through the resin layer, producing problems such that silver is corroded; therefore, it was difficult to make use of a resin mirror.

In the object of collecting solar light, it is preferred to constitute a metal layer with silver exhibiting a high reflectance in the visible region in terms of achieving enhanced reflectance, as described in patent document 2. However, there is the problem that silver is inferior in weather resistance and easily deteriorated with oxygen, moisture or sulfur.

With respect to such a problem, it is anticipated in patent document 2 that a plastic substrate functions as a protective layer for the silver layer. However, plastics easily transmit water vapor or oxygen in the air, so that silver is deteriorated by oxidation, leading to problems such that reflectance of a mirror is lowered.

When using a mirror to reflect sun light, the mirror is often used outside. When using a mirror outdoors, the mirror is exposed to the weather and oxidation deterioration of silver is accelerated under such a severe environment and a lowering of reflectance of the mirror becomes a marked problem.

With respect to a technique for corrosion inhibition of silver, there has been known a technique of coating a corrosion inhibiting layer such as a resin layer as an adjacent layer on the light incident face side (as described in, for example, patent document 3). However, even in such a technique, when used as a mirror for solar light reflection, the mirror is placed under severe outdoor environments and even such a technique could not realize a sufficient effect against corrosion, leading to insufficient dissolution of lowering of reflectance.

Further, there was proposed, as a means for preventing deterioration of the silver mirror, a technique of providing a layer containing a ultraviolet absorber and a corrosion inhibitor as an upper layer for the silver layer (as described in, for example, patent document 4).

However, when a film mirror is used as a reflection device for solar power generation, the mirror is always exposed to the weather or sun light and is used under conditions in which temperature and humidity greatly vary, as compared to the use for a conventional mirror or the like. When adopting the foregoing technique under such conditions, it was proved that "floated off" or "peel-off" of a layer occurs between the layer containing the corrosion inhibitor and the adjacent layer or deformation is generated at the interface to the adjacent silver reflection layer, sometimes leading to a lowering of specular reflectance.

On the other hand, when used as a mirror for solar light reflection, there is a problem such that, as the UV absorption function of a UV absorber is weakened through secular change, deterioration of silver proceeds from the side farthest from the light incident surface, resulting in a lowering of specular reflectance. In a reflection mirror for use in solar power generation, it is required to condense solar light to an intended position, so that it is necessary to maintain not only high reflectance but also enhanced specular reflectance and it was proved that deterioration of silver from the backside caused lowering of specular reflectance, resulting in problems. Further, in the patent document 4, there was disclosed a technique to inhibit corrosion of silver in which a metal layer of copper or the like exhibiting a higher ionization tendency than silver is provided as an adjacent layer to silver of the side farther from the light incident surface to form a victim layer for anti-corrosion of silver. However, it was proved that, when such a technique was applied, there was produced a problem that, since such a victim layer is more corrosion-prone than silver, deterioration of the victim layer proceeds, resulting in deformation of the victim layer, and as a result, the specular reflectance is lowered, rendering it difficult to maintain the desired high specular reflectance of the mirror.

PRIOR ART LITERATURE

Patent Document

Patent document 1: JP 2005-059382 A
Patent document 2: JP 06-038860 A
Patent document 3: JP 2002-122717 A
Patent document 4: US 2006/0181765 A

SUMMARY OF THE INVENTION

Problem to be Solved

As a result of extensive studies by the inventors of the present invention in light of the foregoing problems and circumstances, it was proved that problems such as peeling-off or lowering of specular reflectance was due to the fact that a corrosion inhibitor is eluted under a high temperature, resulting in layer lifting at the interface to an adjacent layer.

It was found by the inventors that the problem of lowering of specular reflectance, caused by deterioration from the backside of a silver mirror was brought about by ultraviolet rays which transmitted through the silver layer. In cases when using a film mirror as a reflection device used for solar power generation, such a film mirror is weak in self-supporting property, as compared to a film mirror and is used, while being laminated to a support such as a metal. Further, a silver layer has the property of transmitting ultraviolet rays of 320 nm or less and the ultraviolet rays which have penetrated the silver layer penetrate a lower layer than the silver layer (on the side far from the light incident side), then, reflected by the support and again enter the lower layer to the silver layer. Accordingly, it was further found that the lower layer to the silver layer was deteriorated by the ultraviolet rays, or the interface between the silver layer and the lower layer was excited, which promoted deterioration of the silver layer, resulting in lowering of the specular reflectance of the silver layer.

Therefore, the problem to be solved in the present invention is to provide a film mirror, which can be prevented from decrease in specular reflectance when a silver layer that serves as a reflective layer is deteriorated, is lightweight and flexible, can be produced at low cost, can have an enlarged surface area, can be produced on a large scale, exhibits excellent light stability and weather resistance, and exhibits good specular reflectance to solar light; a process for producing the film mirror; and a reflection device for solar power generation, which is equipped with such a film mirror.

Means for Solving the Problem

The foregoing problem can be solved by the following constitution.

1. A film mirror comprising at least an adhesive layer, a silver reflection layer and an upper adjacent layer as constituent layers provided on a resin substrate sequentially in this order, wherein at least the upper adjacent layer contains a binder and a corrosion inhibitor for silver.

2. The film mirror, as described in the foregoing 1, wherein the corrosion inhibitor is one which exhibits adsorptivity to silver.

3. The film mirror, as described in the foregoing 1 or 2, wherein the corrosion inhibitor is a heterocyclic compound which exhibits adsorptivity to silver and a melting point of not less than 25° C.

4. The film mirror, as described in any of the foregoing 1 to 3, wherein the adhesive layer and the upper adjacent layer each contain a binder and a corrosion inhibitor for silver.

5. The film mirror, as described in the foregoing 1, 2 or 4, wherein the corrosion inhibitor is an antioxidant.

6. The film mirror, as described in any of the foregoing 1 to 5, wherein the adhesive layer contains the antioxidant and the upper adjacent layer contains the corrosion inhibitor which exhibits adsorptivity to silver.

7. The film mirror, as described in any of the foregoing 1 to 6, wherein a gas bather layer is provided on an upper side of the upper adjacent layer.

8. The film mirror, as described in any of the foregoing 1 to 7, wherein a scratch resistant layer is provided as an outermost layer of the film mirror.

9. The film mirror, as described in any of the foregoing 1 to 8, wherein any one of the constituent layers provided on the resin substrate contains an ultraviolet absorbent.

10. The film mirror, as described in any of the foregoing 1 to 9, wherein a whole layer thickness including the resin substrate is within a range of 75 to 250 µm.

11. A method of producing a film mirror, wherein the film mirror is one, as described in any of the foregoing 1 to 10, and the method comprising a step of forming the silver reflection layer by vapor deposition.

12. A reflection device for solar power generation using a film mirror, as described in any of the foregoing 1 to 10, wherein the film mirror is adhered to a metal substrate via an adherent layer which is provided on the surface of the resin substrate on the side opposite from the silver reflection layer.

Effect of the Invention

According to the foregoing means of the present invention, there can be provided a film mirror which can prevent a decrease in specular reflectance when a silver layer that serves as a reflective layer is deteriorated, is lightweight and flexible, can be produced at low cost, can have an enlarged surface area, can be produced on a large scale, exhibits excellent light stability and weather resistance, and has good specular reflectance to solar light; a process for producing the film mirror, and a reflection device for use in solar power generation, which is equipped with the film mirror.

According to the embodiments of the present invention, there is provided a layer containing a binder and a corrosion inhibitor, as an upper adjacent layer to a silver layer to prevent decrease in reflectance of the reflective layer, and there is also provided a layer containing a binder and a corrosion inhibitor, as an adhesive layer provided as a lower layer to the silver layer, which effectively inhibits such problems that the silver reflection layer is deteriorated from its back side by ultraviolet rays having been transmitted through a silver reflection layer, resulting in decrease in specular reflectance. Further, when there is provided a copper layer or the like, as a substitute lower layer for anti-corrosion of silver, there is a concern that deterioration of the substitute layer results in decrease of specular reflectance, but such problems can be prevented by a layer contains a binder and a corrosion inhibitor.

EMBODIMENTS OF THE INVENTION

The film mirror of the present invention is one which comprises at least an adhesive layer, a silver reflection layer and an upper adjacent layer as constituent layers provided on a resin substrate sequentially in said order, and is featured in that the upper adjacent layer contains a binder and a corrosion inhibitor for silver. Such a feature is a technical feature that is common to the invention related to the claims of claim 1 to claim 12.

In the embodiments of the present invention, the corrosion inhibitor is preferably one which is adsorptive to silver, as an effect of the invention. It is preferred that the corrosion inhibitor is a heterocyclic compound which is adsorptive to silver and exhibits a melting point of not less than 25° C.

In the embodiments of the present invention, it is also preferred that both of the adhesive layer and the upper adjacent layer contain a binder and a corrosion inhibitor for silver. The corrosion inhibitor preferably is an antioxidant. In one preferred embodiment of the invention, the adhesive layer contains the foregoing antioxidant and the upper adjacent layer contains the corrosion inhibitor exhibiting adsorptivity to silver, as described above.

In the present invention, it is preferred that a gas barrier layer is provided on the upper side of the upper adjacent layer. It is also preferred to provide a scratch resistant layer as the outermost layer of the foregoing film mirror. Further, at least one of the constituent layers provided on the resin substrate preferably contains an ultraviolet absorbent.

In the present invention, the thickness of all layers including the resin substrate is preferably within a range of 75 to 250 µm.

The process of producing the film mirror of the invention comprises a step of forming the silver reflection layer by vapor evaporation.

The reflection device for solar power generation using the film mirror of the present invention is one in which the film mirror is adhered to a metal substrate via an adherent layer which is provided on a surface of the resin substrate on the side opposite from the silver reflection layer.

In the following, there will be detailed the present invention and its constituent features, forms and embodiments for working of the present invention. In the present application, the symbol "–" is used, which designates to include numerical values described back and forth as an upper limit value and a lower limit value.

Brief Summary of Constitution of Film Mirror:

The film mirror of the present invention is one which comprises at least an adhesive layer, a silver reflection layer and an upper adjacent layer as constituent layers provided on a resin substrate sequentially in that order, in which at least the upper adjacent layer contains a binder and a corrosion inhibitor for silver. It is also a preferred embodiment to provide a specific functional layer such as a gas barrier layer or a scratch resistant layer in addition to the adhesive layer, the silver reflection layer and the upper adjacent layer.

Resin Substrate:

The resin substrate related to the present invention can employ various resin films known in the art. Examples thereof include a cellulose ester film, polyester film, polycarbonate film, polyarylate film, polysulfone (including polyether sulfone) film, polyester film such as polyethylene terephthalate or polyethylene naphthalate, polyethylene film, polypropylene film, cellophane, cellulose diacetate film, cellulose triacetate film, cellulose acetate propionate film, cellulose acetate butyrate film, polyvinylidene chloride film, polyvinyl alcohol film, ethylene vinyl alcohol film, syndiotactic polystyrene film, polycarbonate film, norbornene resin film, polymethylpentene film, polyether ketone film, poly(ether ketone imide) film, polyamide film, fluororesin film, nylon film, poly(methyl methacrylate) film, and polyacrylate film. Of these, a polycarbonate film, polyester film, norbornene film and cellulose ester film are preferred.

It is specifically preferred to use a polyester film or cellulose ester film, which may be a film produced by melt cascade casting or a film produced by solution casting.

The thickness of a resin substrate is suitably chosen, depending on the kind or object of a resin. For instance, the thickness is generally within a range of 10 to 300 µm, preferably 20 to 200 µm, and more preferably 30 to 100 µm.

Adhesive Layer:

The adhesive layer related to the present invention may be any one having a function of enhancing adhesion between the silver reflection layer and the resin substrate, which is not specifically restricted but preferably formed of a resin. Accordingly, the said adhesive layer requires adhesiveness to allow the metal reflection layer to adhere to the resin substrate (resin film), heat resistance capable of being resistant to heat at the time when forming a metal reflection layer by vacuum deposition and smoothness to bring about high reflection performance which the metal reflection layer inherently exhibits.

Any resin which satisfies the foregoing adhesiveness, heat resistance and smoothness is usable as a binder for the adhesive layer and includes, for example, a polyester resin, an acrylic resin, a melamine resin, an epoxy resin, polyamide resin, a vinyl chloride resin, and a copolymer resin of vinyl chloride and vinyl acetate, which may be used singly or in combination. Of these, a mixture resin of a polyester resin and a melamine resin is preferred in terms of weather resistance, and a heat-setting type resin in which a curing agent such as an isocyanate or the like is contained is more preferred.

The thickness of the said adhesive layer is preferably from 0.01 to 3.0 µm, and more preferably from 0.1 to 1.0 µm in terms of its adhesiveness or smoothness and reflectance of a reflecting material.

Formation of an adhesive layer is conducted by conventional methods known in the art, such as a gravure coat method, a reverse coat method, or a die coat method.

Silver Reflection Layer:

A method of the silver reflection layer related to the present invention may employ both a wet process and a dry process.

A wet process is the general name for plating methods, in which a metal is deposited from solution to form a membrane. Specific example include a silver mirror reaction.

On the other hand, a dry process is the general name for vacuum film forming methods and specific examples include a resistance heating vacuum vapor deposition method, an electron beam heating vacuum vapor deposition method, an ion plating method, an ion-beam-assisted vacuum deposition method and a sputtering method. Specifically, in the present invention, there is preferably employed a vapor deposition method in which a roll-to-roll system for continuous film formation is feasible. Namely, the method of producing the film mirror of the present invention preferably is a production method including a step of forming the said silver reflection layer by silver vapor deposition.

The thickness of the said silver reflection layer is preferably from 10 to 200 nm in terms of reflectance, and more preferably from 30 to 150 nm.

In the present invention, the silver reflection layer may be placed on the light-incident side to the support or on the opposite side, but is placed preferably on the light incident side in view of the support being a resin and also for the purpose of preventing the resin from deterioration by light beams.

Upper Adjacent Layer:

An upper adjacent layer used in the film mirror of the present invention is adjacent to a silver reflection layer on the side far from the resin substrate (support), contains a corrosion inhibitor to prevent silver from corrosion deterioration and contributes to prevention of the silver reflection layer from scratching and an enhancement of adhesive strength to a barrier layer or a scratch resistant layer which is formed on the outer side of the upper adjacent layer.

A resin as a binder used for the upper adjacent layer may employ a polyester resin, acrylic resin, melamine resin and epoxy resin singly or in combination. Of these, a polyester resin or acrylic resin is preferable, and its mixture with a hardening agent such as an isocyanate compound, as a heat-curing, is more preferable.

There are usable various kinds of conventional isocyanates, such as TDI (tolylenediisocyanate) type, XDI ( ) type, MDI (methylenediisocyanate) type and HMDI (hexamethylenediisocyanate) type. Of these isocyanates, XDI type, MDI type and HMDI type isocyanates are preferred in terms of weather resistance.

The thickness of the upper adjacent layer is preferably from 0.01 to 3 μm in terms of adhesiveness and weather resistance, and more preferably from 0.1 to 1 μm.

The upper adjacent layer can be formed by commonly known methods such as a gravure coat method, a reverse coat method and a die coat method.

Corrosion Inhibitor:

Corrosion inhibitors for use in a silver reflection layer of the film mirror of the present invention are mainly classified into a corrosion inhibitor which is adsorptive to silver and an antioxidant.

Herein, "corrosion" refers to a phenomenon in which a metal (or silver) is chemically or electrochemically eroded or materially deteriorated (refer to JIS Z0130-2004).

In one of the preferred embodiments of the film mirror of the present invention, the foregoing adhesive layer contains an antioxidant and the foregoing upper adjacent layer contains a corrosion inhibitor which is adsorptive to silver.

The content of a corrosion inhibitor, which depends on a compound to be used, is preferably within a range of 0.1 to 1.0 g/m$^2$.

Silver-Adsorptive Corrosion Inhibitor:

A corrosion inhibitor exhibiting adsorptivity to silver (which is hereinafter also denoted as a silver-adsorptive corrosion inhibitor) is preferably selected from amines and their derivatives, a compound containing a pyrrole ring, a compound containing a triazole ring, a compound containing a pyrazole ring, a compound containing an imidazole ring, a compound containing an indazole ring, a copper chelate compound, thioureas, a compound containing a mercapto group and naphthalene type compounds, which are used singly or in their combination.

Examples of amines and their derivatives include ethylamine, laurylamine, tri(n-butyl)amine, o-toluidine, diphenylamine, ethylenediamine, diethylenetriamine, triethylenetetramine, tetraethylenepentamine, monoethanolamine, diethanolamine, triethanolamine, 2N-dimethyletanolamine, 2-amino-2-methyl-1,3-propanediol, acetoamide, acrylamide, benzamide, p-ethoxy-Chrysoidine, dicyclohexylammonium nitrite, dicyclohexylammonium salicyrate, monoethanolamine benzoate, dicyclohexylammonium benzoate, diisopropylammonium benzoate, diisopropylammoniumnitrite, cyclohexylamine carbamate, nitronaphthalene ammonium nitrite, cyclohexylamine benzoate, dicyclohexylammonium cyclohexanecarboxylate, cyclohexylamine cyclohexanecarboxylate, dicyclohexylammonium acrylate, cyclohexylamine acrylate and a mixture of these amino compounds.

Examples of a compound containing a pyrrole ring include N-butyl-2,5-dimethylpyrrole, N-phenyl-2,5-dimethylpyrrole, N-phenyl-3-formyl-2,5-dimethylpyrrole, N-phenyl-3,4-diformyl-2,5-dimethylpyrrole, and a mixture of those pyrrole compounds.

Examples of a compound containing a triazole ring include 1,2,3-triazole, 1,2,4-triazole, 3-mercapto-1,2,4-triazole, 3-hydroxy-1,2,4-triazole, 3-methyl-1,2,4-triazole, 1-methyl-1,2,4-triazole, 1-methyl-3-mercapto-1,2,4-triazole, 4-methyl-1,2,3-triazole, benzotriazole, tolyltriazole, 1-hydroxybenzotriazole, 4,5,6,7-tetrahydrotriazole, 3-amino-1,2,4-triazole, 3-amino-5-methyl-1,2,4-triazole, carboxybenzotriazole, 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2'-hydroxy-4-octoxyphenyl)benzotriazole and a mixture of those triazole compounds.

Examples of a compound containing a pyrazole ring include pyrazole, pyrazoline, pyrazolone, pyrazolidine, pyrazolidone, 3,5-dimethylpyrazole, 3-methyl-5-hydroxypyrazole, 4-aminopyrazole, and a mixture of those compounds.

Examples of a compound containing a thiazole ring include thiazole, thiazoline, thiazolone, thiazolidine, thiazolodone, isothiazole, benzothiazole, 2-N,N'-diethylthiobenzothiazole, p-dimethylminobenzalrhodanine, 2-mercaptobenzothiazole, and a mixture of those compounds.

Examples of a compound containing an imidazole ring include imidazole, histidine, 2-heptadecylimidazole, 2-methylimidazole, 2-ethyl-4-methylimidazole, 2-phenylimidazole, 2-undecylimidazole, 1-benzyl-2-methylimidazole, 2-phenyl-4-methylimidazole, 1-cyanoethyl-2-methylimidazole, 1-cyanoethyl-2-phenylimidazole, 1-cyanoethyl-2-ethyl-4-methylimidazole, 1-cyanoethyl-2-undecylimidazole, 2-phenyl-4-methyl-5-hydromethylimidazole, 2-phenyl-4,5-dihydroymethylimidazole, 4-formylimidazole, 2-methyl-4-formylimidazole, 2-phenyl-4-formylimidazole, 4-methyl-5-formylimidazole, 2-ethyl-methyl-5-formylimidazole, 2-phenyl-4-methyl-formylimidazole, 2-mercaptobenzoimidazole and a mixture of those compounds.

Examples of a compound containing an indazole ring include 4-chloroindazole, 4-nitroindazole, 5-nitroindazole, 4-cloro5-nitroindazole, and a mixture of those compounds.

Examples of a copper chelate compound include copper acetylacetone, copper ethylenediamine, copper phthalocyanine, copper ethylenediamine tetraacetate, copper hydroxyquinoline, and a mixture of those compounds.

Examples of thioureas include thiourea, guanylthiourea and a mixture of these compounds.

Examples of a compound containing a mercapto group include mercaptoacetic acid, thiophenol, 1,2-ethanedithiol, 30mercapto-1,2,4-triazole, 1-methyl-3-mercapto-1,2,4-triazole, 2-mercaptobenzothiazole, 2-mercaptobenzoimidazole, glycol dimercaptoacetate, 3, mercaptopropyltrimethoxysilane and a mixture of those compounds.

Examples of a naphthalene type compounds include thionalide.

Heterocyclic Compound Exhibiting Adsorptivity to Silver and Melting Point of 25° C. or Higher.

It is desirable that a corrosion inhibitor of a heterocyclic compound exhibiting adsorptivity to silver and a melting point of not less than 25° C. is at least one selected from the group of a compound containing a pyrrole ring, a compound containing a triazole ring, a compound containing a pyrrole ring a compound containing a pyrazole ring, a compound containing a thiazole ring, a compound containing an imidazole ring, a compound containing an indazole ring, a heterocyclic compound containing a mercapto group, or a mixture of these compounds.

Specific examples of a corrosion inhibitor which is a heterocyclic compound and exhibits adsorptivity to silver and a melting point of not less than 25° C. are shown below.

Examples of a compound containing a pyrrole ring include N-butyl-2,5-dimethylpyrrole, N-phenyl-2,5-dimethylpyrrole, N-phenyl-3-formyl-2,5-dimethylpyrrole, N-phenyl-3,4-diformyl-2,5-dimethylpyrrole, and their mixture.

Examples of a compound containing a triazole ring include 1,2,3-triazole, 3-mercapto-1,2,4-triazole, 3-hydroxy-1,2,4-triazole, 3-methyl-1,2,4-triazole, 1-methyl-1,2,4-triazole, 1-methyl-3-mercapto-1,2,4-triazole, 4-methyl-1,2,3-triazole, benzothiazole, tolyltriazole, 1-hydroxybenzotriazole, 4,5,6,7-tetrahydrotriazole, 3-amino-1,2,4-triazole, 3-amino- 5-methyl-1,2,4-triazole, carboxybenzotriazole, 2-(2'-hydroxy-5'-methylphenyl)benzotriazole, 2-(2'-hydroxy-5'-tert-butylphenyl)benzotriazole, 2-(2'-hydroxy-3(5'-di-tert-butylphenyl)benzotriazole, 2-(2'-hydroxy-4-octoxyphenyl) benzotriazole and a mixture of these compounds.

Examples of a compound containing a pyrazole ring include pyrazole, pyrazoline, pyrazolone, pyrazolidine, pyrazolidine, 3,5-dimethylpyrazole, 3-methyl-5-hydroxypyrazole, 4-aminopyrazole and a mixture of these compounds.

Examples of a compound containing a thiazole ring include thiazole, thiazoline, thiazolone, thiazolidine, thiazolidone, isothiazole, benzothiazole, 2-N,N-diethylthiobenzothiazole, p-dimethylaminobenzalrhodanine, 2-mercaptobenzothaizole and a mixture of these compounds.

Examples of a compound containing an imidazole ring include imidazole, histidine, 2-heptadecylimidazole, 2-methylimidazole, 2-ethyl-4-methylimidazole, 2-phenylimidazole, 2-undecylimidazole, 1-benzyl-2-methylimidazole, 2-phenyl-4-methylimidazole, 1-cyanoethyl-2-methylimidazole, 1-cyanoethyl-2-phenylimidazole, 1-cyanoethyl-2-ethyl-4-methylimidazole, 1-cyanoethyl-2-undecylimidazole, 2-phenyl-4-methyl-5-hydromethylimidazole, 2-phenyl-4,5-dihydroxymethylimidazole, 4-formylimidazole, 2-methyl-4-formylimidazole, 2-phenyl-4-formylimidazole, 4-methyl-5-formylimidazole, 2-ethyl-4-formylimidazole, 2-mercaptoimidazole and a mixture of these compounds.

Examples of a compound containing an indazole ring include 4-chloroindazole, 4-nitroindazole, 5-nitroindazole, 4-chloro5-nitroindazole and a mixture of these compounds.

Examples of thioureas include thiourea, guanidylthiourea and a mixture of these compounds.

Examples of a compound containing a mercapto group include, in addition to the foregoing materials, 3-mercapto-1,2,4-triazole, 1-methyl-3-mercapto-1,2,4-triazole, 2-mercaptobenzothiazole, 2-mercaptobenzimidazole and a mixture of these compounds.

Antioxidant:

There can also be used an antioxidant, as a corrosion inhibitor for the silver reflection layer used in the film mirror of the present invention.

It is preferred to use, as an antioxidant, a phenol type antioxidant, a thiol type antioxidant and a phosphite type antioxidant.

Examples of a phenol type antioxidant include 1,1,3-tris(2-methyl-4-hydroxy-5-t-butylphenyl)butane, 2,2'-methylenebis(4-ethyl-6-t-butylphenol), tetrakis-[methylene-3-(3', 5'-di-t-butyl-4'-hydroxyphenyl)propionate]methane, 2,6-di-t-butyl-p-cresol, 4,4'-thiobis(3-methyl-6-t-butylphenol), 4,4'-butylidenebis(3-methyl-6-t-butylphenol), 1,3,5-tris(3', 5'-di-t-butyl-4'-hydroxybenzyl)-S-triazine-2,4,6-(1H,3H, 5H)trione, stearyl-β-(3,5-di-t-butyl-4-hydroxypenyl)propionate, triethylene glycol bis[3-(3-t-butyl-5-methyl^4-hydroxyphenyl)propionate], 3,9-bis{1,1-di-methyl-2-[β-(3-t-butyl-4-hydroxy-5-methylphenyl)propionyloxy]ethyl}-2, 4,8,10-tetraoxioxaspiro[5,5]undecane, and 1,3,5-trimethyl-2,4,6-tris(3,5-di-t-butyl-4-hydroxybenzyl)benzene. A phenol type antioxidant having a molecular weight of not less than 550 is specifically preferred.

Examples of a thiol type antioxidant include distearyl-3, 3'-thiodipropionate, and pentaerythritol-tetrakis-β-lauryl-thiopropionate).

Examples of a phosphite type antioxidant tris(2,4-di-t-butylphenyl)phosphate, distearylpentaerythritol diphosphite, di(2,6-di-t-butylphenyl)pentaerythritol diphosphite, bis-(2, 6-di-t-butyl-4-methylphenyl)-pentaerythritol diphosphite, tetrakis(2,4-di-t-butylphenyl)-4,4-biphenylene-diphosphonite, and 2,2'-methylenebis(4,6-di-t-butylphenyl)octylphosphite.

In the present invention, there may be used the foregoing antioxidant and a light stabilizer described below in combination.

Examples of a hindered amine type light stabilizer include bis(2,2,6,6-tetramethyl-4-piperidyl)sebacate, bis(1,2,2,6,6-pentamethyl-4-piperidyl)sebacate, bis(1,2,2,6,6-pentamethyl-4-piperidyl)-2-(3,5-di-t-butyl-4-hydroxybenzyl)-2-n-butylmalonate, 1-methyl-8-(1,2,2,6,6-pentamethyl-4-piperidyl)sebacate, 1-{2-[3^(3,5-di-t-butyl-4-hydroxyphenyl)propionyloxy]ethyl}-4-[3-(3,5^di-t-butyl-4-hydroxyphenyl)propionyloxy]2,2,6,6-tetramethylpiperidine, 4-benzoyloxy-2,2,6,6-tetmmethylpiperidine, tetrakis(2,2,6,6-tetramethyl-4-piperidyl)-1,2,3,4-butane-tetracarboxylate, triethylenediamine, and 8-acetyl-3-dodecyl-7,7,9,9-tetramethyl-1,3,8-triazaspiro[4,5]decane-2,4-dione.

Further, there is also usable a nickel type ultraviolet stabilizer such as [2,2'-thiobis(4-t-octylphenolate)]-2-ethylhexylamine nickel (II), nickel complex-3,5-di-t-butyl-4-hydroxybenzyl.phosphoric acid monoethylate, or nickel.dibutyl-dithiocarbamate.

Of hindered amine type light stabilizers, one which contains only a tertiary amine, is preferred and specific examples thereof include bis(1,2,2,6,6-pentamethyl-4-piperidyl)-sebacate, bis(1,2,2,6,6-pentamethyl-4-piperidyl)-2-(3,5-di-t-butyl-4-hydroxybenzyl)-2-n-butylmalonate. Further, a condensate of 1,2,2,6,6-pentamethyl-4-piperidinol/tridecylalcohol and 1,2,3,4-butanetetracarboxylic acid is also preferred.

Gas Barrier Layer:

A gas barrier layer related to the present invention is one to prevent the resin substrate and various functional elements protected by the resin substrate from deteriorating by variations of humidity, specifically by high humidity, which may be provided with a special function or use. As long as the foregoing characteristic is maintained, there can be provided gas barrier layers of various forms. In the present invention, it is preferred to provide a gas barrier layer on or above the foregoing upper adjacent layer.

The moisture resistance of the gas barrier layer is preferably controlled so that the water vapor permeability at 40° C. and 90% RH is not more than 100 g/m$^2$·day/μm, preferably not more than 50 g/m$^2$·day/μm, and more preferably not more than 20 g/m$^2$·day/μm. Further, oxygen permeability is preferably not more than 0.6 ml/m$^2$/day/atm under the measurement conditions of 23° C. and 90% RH.

The method of forming the gas barrier layer related to the present invention is not specifically restricted, but there is preferably used a method in which a ceramic precursor of an inorganic oxide layer is coated and the coated layer is subjected to heating and/or exposure to ultraviolet rays to form an inorganic oxide membrane.

Ceramic Precursor:

A gas barrier layer related to the present invention can be formed in such a manner that a ceramic precursor which is capable of forming an inorganic oxide layer through heating is coated and then a general heating method is applied thereto to the layer, and preferably, the layer is formed by local heating. Such a ceramic precursor preferably is an organic metal compound in a sol form or a polysilazane.

Organic Metal Compound:

An organic metal compound related to the present invention preferably contains at least one element selected from the group of silicon (Si), aluminum (Al), lithium (Li), zirconium (Zr), titanium (Ti), tantalum (Ta), zinc (Zn), barium (Ba), indium (In), tin (Sn), lanthanum (La), yttrium (Y), and niobium (Nb). Specifically, the organic metal compound preferably contains at least one element selected from the group of silicon (Si), aluminum (Al), lithium (Li), zirconium (Zr), titanium (Ti), zinc (Zn) and barium (Ba). It is more preferred to contain at least one element selected from the group of silicon (Si), aluminum (Al), and lithium (Li).

Such an organic metal compound may be one which is hydrolysable, and is not specifically limited but a preferable organic compound is a metal alkoxide.

The foregoing metal alkoxide is represented by the following formula (1):

$$MR^2{}_m(OR^1)_{n-m} \quad \text{Formula (1)}$$

In the formula (1), M is a metal of an oxidation number of n, $R^1$ and $R^2$ are each independently an alkyl group, and m is an integer of from 0 to (n−1). $R^1$ and $R^2$, which may be the same or different, preferably are each an alkyl group having not less than four carbon atoms. Specifically, a lower alkyl group is preferable, and including, for example, methyl group, $CH_3$ (hereinafter, also denoted as Me), ethyl group, $C_2H_5$ (hereinafter, also denoted as Et), propyl group $C_3H_5$ (hereinafter, also denoted as Pr), isopropyl group $C_3H_5$ (hereinafter, also denoted as i-Pr), butyl group $C_4H_7$ (hereinafter, also denoted as Bu), and isobutyl group $C_4H_7$ (hereinafter, also denoted as i-Bu).

Examples of a suitable metal alkoxide, as represented by the foregoing formula (1) include lithium ethoxide LiOEt, niobium ethoxide $Nb(OEt)_5$, magnesium isopropoxide $Mg(Oi-Pr)_2$, aluminum isopropoxide $Al(Oi-Pr)_3$, zinc propoxide $Zn(OPr)_2$, tetraethoxysilane $Si(OEt)_4$, titanium isopropoxide $Ti(Oi-Pr)$, barium ethoxide $Ba(OEt)_2$, barium isopropoxide $Ba(Oi-Pr)_2$, triethoxyborane $B(OEt)_3$, zirconium propoxide $Zr(OPr)_4$, lanthanum propoxide $La(OPr)_3$, yttrium propoxide $Yt(OPr)_3$ and lead isoproxide $Pb(Oi-Pr)_2$. These metal alkoxides are commercially available and can be easily obtained. A metal alkoxide is also commercially available in the form of a low condensation product, which is obtained through partial hydrolysis and also usable as a raw material.

Inorganic Oxide:

An inorganic oxide related to the present invention is characterized in that it is formed from a sol of the foregoing organic metal compound through local heating. Therefore, it is characterized in that such an inorganic oxide is an oxide of an element such as silicon (Si), aluminum (Al), zirconium (Zr), titanium 'Ti), tantalum (Ta), zinc (Zn), barium (Ba), indium (In), tin (Sn) or niobium (Nb) which is contained in an organic metal compound.

Such an inorganic oxide is, for example, silicon oxide, aluminum oxide, or zirconium oxide, of which silicon oxide is preferred.

In the present invention, formation of an inorganic oxide from an organic metal compound preferably employs a sol-gel method or a method of coating a polysiloxane.

Sol-Gel Method:

A sol-gel method refers to a process in which an organic metal compound is hydrolyzed to obtain a sol of a hydroxide, which is dehydrated to obtain a gel, and the gel is subjected to a heating treatment to prepare a metal oxide glass of a steady form (film form, particle form, fibrous form or the like). A poly-component metal oxide glass can also be obtained by a method of mixing different plural sol solutions or by addition of other metal ions.

Specifically, an inorganic oxide is produced preferably by a sol-gel method comprising the steps described below.

Namely, the sol-gel method comprises the steps of subjecting an organic metal compound to hydrolysis and dehydration condensation in the presence of a boron ion in a reaction solution containing at least water and an organic solvent with controlling the pH at 4.5 to 5.0 to obtain a reaction product, and heating the reaction product at a temperature of not more than 200° C. to perform vitrification. Such a method is specifically preferred in which generation of micropores or deterioration of membrane by a high temperature treatment is not caused.

In the foregoing sol-gel method, an organic metal compound used as a raw material may be any one which is capable of being hydrolyzed, and is not specifically limited, but a metal alkoxide, as described earlier is cited as a preferable organic metal compound.

In the sol-gel method, the foregoing organic metal compound may be used in the reaction without any change, but it is preferred to dilute the reaction mixture with a solvent to make it easier to control the reaction. Such a solvent used for dilution may be any one which is capable of dissolving the organic metal compound and being homogeneously miscible with water. Examples of such a solvent include aliphatic lower alcohols such as methanol, ethanol, propanol, isopropanol, butanol, isobutanol, ethylene glycol, propylene glycol and their mixtures. There are also usable a mixed solvent of butanol, cellosolve and butyl cellosolve, or a mixed solvent of xylol, cellosolve acetate, methyl isobutyl ketone and cyclohexane.

In cases when the foregoing organic metal compound is comprised of a metal of Ca, Mg or Al, such a metal often reacts with water in a reaction solution to form an hydroxide or forms a carbonate salt in the presence of carbonate ions ($CO_3^{2-}$), so that it is preferable to add an alcoholic solution of triethanolamine as a masking agent to the reaction solution. The organic metal compound is dissolved in a mixed solvent, preferably at a concentration of not more than 70% by mass, and is also diluted preferably to a range of 5 to 70% by mass when it is used.

A reaction solution used in the sol-gel method contains at least water and an organic solvent. Such an organic solvent may be any one which is capable of forming a homogeneous solution with water, an acid or a base, and preferable examples thereof includes lower aliphatic alcohols or the like which are usually used for dilution of the foregoing organic metal compound. Of the foregoing lower aliphatic alcohols, propanol, isopropanol, butanol or isobutanol is preferable rather than methanol or ethanol. This is due to the fact that growth of formed metal oxide glass film is stable. In the foregoing reaction solution, water is contained preferably at a concentration of 0.2 to 50 mol/L.

In the sol-gel method, an organic metal compound is hydrolyzed with using a halogen ion as a catalyst in the presence of a boron ion in the foregoing reaction solution. There is cited a trialkoxyboran $B(OR)_3$, as a suitable example of a compound giving rise to the foregoing boron ion. Specifically, triethoxyboran $B(OEt)_3$ is preferred. Further, the $B^{3+}$ ion concentration in the foregoing reaction solution is preferably within the range of 1.0 to 10.0 mol/L.

Preferable examples of a halogen ion include a fluorine ion and/or a chlorine ion. Namely, such a fluorine ion and a chlorine ion may be single or a mixture of them. There is usable any compound which gives rise to a fluorine ion and/or a chlorine ion in the foregoing reaction solution. For example, ammonium hydrogendifluoride $NH_4HF\cdot HF$ and sodium fluoride $NaF$ are cited as a preferable fluorine source, and ammonium chloride $NH_4Cl$ is cited as a chlorine source.

The halogen ion concentration of halogen ions in the foregoing reaction solution is varied depending on the thickness of film formed of an inorganic composition having an inorganic matrix to be produced, but is usually from 0.001 to 2 mol/kg, and preferably from 0.002 to 0.3 mol/kg, based on the total mass of the foregoing reaction solution containing a catalyst. A halogen ion concentration of less than 0.001 mol/kg renders it difficult to allow hydrolysis of an organic metal compound to sufficiently proceed, making it difficult to form a film. On the other hand, when a halogen ion concentration exceeds 2 mol/kg, the formed inorganic matrix (metal oxide glass) tends to become non-uniform. Therefore, both cases are not preferable.

With respect to boron used at the time of the reaction, when contained as a $B_2O_3$ component in the designed composition of the obtained inorganic matrix, an organic boron compound is added in a calculated amount in accordance with the content of the product. When intended to remove boron, the formed film is heated in the presence of or with being dipped in methanol as a solvent and the boron is removed in the form of a boron methyl ester.

In the process of being subjecting the foregoing organic metal compound to hydrolysis and dehydration condensation to obtain a reaction product, a main reagent solution in which a given amount of the foregoing organic metal compound was dissolved in a mixed solvent containing prescribed amounts of water and an organic solvent, and a reaction solution containing a prescribed amount of the foregoing halogen ion were mixed at a given ratio and sufficiently stirred to form a homogeneous reaction solution; then, the reaction solution was adjusted to a prescribed pH value and ripened for a few hours to obtain the reaction product. A given amount of the foregoing boron compound was previously dissolved in the main reagent solution or in the reaction solution. When using an alkoxyborane, it is advantageous to dissolve it in the main solvent together with other organic metal compounds.

The pH value of the foregoing reaction solution is chosen according to the object. When it is intended to form a membrane (film) composed of the inorganic composition containing an inorganic matrix (metal oxide glass), it is preferred to control the pH to a range of 4.5 to 5 by using an acid such as hydrochloric acid or the like. In that case, it is useful to use, as an indicator, a mixture of Methyl Red and Bromocresol Green.

In the sol-gel method described earlier, a main reagent solution containing the same components at the same concentrations and the reaction solution (containing $B^{3+}$ and a halogen ion) are sequentially added supplementally at the same proportion with controlling the pH to the prescribed value, whereby the reaction product can be simply, and continuously produced. The concentration of the reaction solution described above, the concentration of water (containing an acid or alkali), and the halogen ion concentration are variable within ranges of ±50%, +30%, and +30%, respectively.

Then, the reaction product obtained in the preceding process (reaction solution after ripening) is heated at a temperature of not more than 200° C. to be vitrified. During heating, it is preferred that the temperature is carefully and gradually increased specifically within the range of 50 to 70° C. and after passing through the stage of pre-drying (solvent volatilization), the temperature is further raised. Such drying is important to form a nonporous film in cases when forming film. After the stage of pre-drying, drying by heating is conducted preferably at a temperature of 70 to 150° C., and more preferably 80 to 130° C.

Method of Coating Polysialzane:

It is also preferred that the gas barrier layer related to the present invention contains an inorganic oxide which is formed by coating a ceramic precursor capable of forming inorganic oxide film upon heating, followed by local-heating of the coated film.

When such a ceramic precursor contains a polysilazane, it is preferred that the resin substrate is coated with a solution containing a polysilazane represented by the following formula (1) and a catalyst as needed in an organic solvent; then, evaporation of the solvent leaves a 0.05 to 3.0 μm thick polysialzane layer, which is locally heated in the presence of oxygen and active oxygen, and nitrogen as needed in an atmosphere containing water vapor to form a glass-like transparent film on the resin substrate:

$$—(SiR_1R_2—NR_3)_n—\qquad \text{Formula (1)}$$

wherein $R_1$, $R_2$ and $R_3$, which may be the same or different, are each independently hydrogen, an alkyl group, an aryl group, a vinyl group or (trialkoxysilyl)alkyl group, which may be substituted, and preferably are groups selected from the group of hydrogen, methyl, ethyl, propyl, iso-propyl, butyl, iso-butyl, tert-butyl, phenyl, vinyl, 3-(triethoxysilyl) propyl and 3-(trimethoxysilyl)propyl; and n is an integer, provided that n is defined so that said polysilazane has a number average molecular weight of 150 to 150,000 g/mol.

A basic catalyst is preferably used as a catalyst. Specifically, there is preferably used N,N-dimethylethanolamine, N,N-diethylethanolamine, triethanolamine, triethylamine, morpholinopropylamine or N-heterocyclic compound. Such a catalyst is used usually at a concentration of 0.1 to 10 mol %, and preferably 0.5 to 7 mol %.

In one preferred embodiment of the present invention, there is used a solution containing perhydropolysilazane in which all of $R_1$, $R_2$ and $R_3$ are hydrogen atoms.

In another preferred embodiment, a coating by the present invention contains at least a polysilazane represented by the following formula (II):

$$—(SiR_1R_2—NR_3)_n—(SiR_4R_5—NR_6)_p—\qquad \text{Formula (II)}$$

wherein $R_1$, $R_2$, $R_3$, $R_4$, $R_5$ and $R_6$ are independently hydrogen, an alkyl group, an aryl group, a vinyl group, or a (trialkoxysilyl)alkyl group; n and p are each an integer, and n is defined so that said polysilazane has a number average molecular weight of 150 to 150,000 g/mol.

A compound in which $R_1$, $R_3$ and $R_3$ are each a hydrogen and $R_2$, $R_4$ and $R_6$ are each methyl, a compound in which $R_1$, $R_3$ and $R_3$ are each a hydrogen, $R_2$ and $R_4$ are methyl, and $R_5$ is vinyl, and a compound in which $R_1$, $R_3$, $R_4$ and $R_6$ are each hydrogen, and $R_2$ and $R_5$ are each methyl, are specifically preferred.

Further, a solution containing a polysilazane represented by the following formula (III) is also preferable:

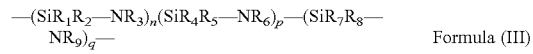
$$—(SiR_1R_2—NR_3)_n(SiR_4R_5—NR_6)_p—(SiR_7R_8—NR_9)_q—\qquad \text{Formula (III)}$$

wherein $R_1$, $R_2$, $R_3$, $R_4$, $R_5$, $R_6$, $R_7$, $R_8$, and $R_9$ are each hydrogen, an alkyl group, an aryl group, a vinyl group or an (alkoxysilyl)alkyl group, which may be substituted; n, p and q are each an integer, provided that n is defined so that said polysiloxane exhibits a number average molecular weight of 150 to 150,000 g/mol.

Specifically, a compound in which $R_1$, $R_3$ and $R_6$ is (triethoxy)propyl and $R_7$ is an alkyl group or hydrogen, is preferred.

The proportion of a polysilozane in a solvent is generally from 1 to 80% by mass, preferably from 5 to 50% by mass and more preferably from 10 to 40% by mass.

A solvent preferably is an organic one which does not contain water and a reactive group (for example, a hydroxyl group or amine group) and is inert to polysilazane, and more preferably, a non-protonic one. Examples thereof include an aliphatic or non-aliphatic hydrocarbon, a halogenated hydrocarbon, an ester, such as ethyl acetate or butyl acetate, a ketone such as acetone or methyl ethyl ketone, an ether such as tetrahydrofuran or Dibutyl ether, mono- or poly-alkylene glycol dialkyl ether (diglymes) and a mixture of these.

Further supplement components added to the foregoing polysilazane include a binder such as used in conventional paints. Specific examples of a binder include a cellulose ether and a cellulose ester such as ethyl cellulose, nitrocellulose, cellulose acetate, cellulose acetobutylate, a natural resin such as rubber or rosin resin, and a synthetic resin, for example, a polymer resin or condensation resin, such as aminoplast, specifically, urea resin or melamine formaldehyde resin, alkyd resin, acryl resin, polyester or modified polyester, epoxide, polyisocyanate or blocked polyisocyanate, or polysiloxane.

Other components of said polysiloxane mixture include, for example, additives affecting viscosity, wettability of a substrate, film forming property, lubricating action or exhaust, such as $SiO_2$, $TiO_2$, ZnO, $ZrO_2$ and $Al_2O_3$.

Application of the method of the present invention makes it possible to prepare a close glassy film which has no crack or pore and exhibits enhanced barrier action to gas.

The thickness of the thus formed film is preferably within the range of 100 nm to 2 μm.

Scratch Resistant Layer:

In the present invention, there can be provided a scratch resistant layer as the outermost layer of the film mirror. The scratch resistant layer is provided for scratch prevention.

The scratch resistant layer may be composed of an acryl resin, a urethane resin, a melamine resin, an epoxy resin, an organic silicate resin or a silicone resin. Specifically, a silicone resin or acryl resin is preferred in terms of curability and durability. Further, an actinic energy ray-curable acryl resin or a heat-curable acryl resin is also preferred in terms of curability, flexibility or productivity.

Such an actinic energy ray-curable acryl resin or a heat-curable acryl resin is a composite containing, as a curable component, a polyfunctional acrylate, an acryl oligomer or a reactive diluent. Further, there may optionally be contained a photoinitiator, a photosensitizer or a heat-polymerization initiator.

The foregoing acryl oligomer is one in which a reactive acryl group is bonded to an amyl backbone and also includes a polyester acrylate, a urethane acrylate, epoxy acrylate and polyether acrylate, and there is also usable one in which an acryl group is attached to a rigid backbone such as melamine or isocyanuric acid.

The reactive diluent is one which has a function of a solvent in the process of coating, as a medium for a coating material and also contains a group capable of reacting with a monofunctional or polyfunctional acryl oligomer, forming a copolymerization component of a coated film.

There are also employable commercially available polyfunctional acryl-curable coating materials, and including, for example, "DIA BEAM" (trade name) series, produced by Mitsubishi Rayon Co, Ltd.; "DENACOL" (trade name) series, produced by Nagase Sangyo Co., Ltd.; "NK ESTER" (trade name) series, produced by Shin-Nakamura Co., Ltd.; "UNIDIC" (trade name) series, produced by DIC Co., Ltd.; "ARONIX" (trade name) series, produced by Toa Gosei Co., Ltd.; "BLEMER" (trade name) series, produced by Nippon Yushi Co., Ltd.; "KAYARAD" (trade name) series, produced by Nippon Kayaku Co., Ltd.; "LIGHT ESTER" (trade name) series and "LIGHT ACRYLATE" (trade name) series, produced by Kyoei-sha Kayaku Co., Ltd.

In the present invention, various additives may be incorporated in the scratch resistant layer within a range not impairing the effect of the present invention. Examples of such additives include a stabilizer such as an antioxidant, light stabilizer or ultraviolet absorber, a surfactant, a leveling agent and an antistatic agent.

Said leveling agent is effective to reduce any irregularities of the surface. Dimethylpolysiloxan-polyoxyalkylene copolymer (for example, SH 190, produced by Toray Dow Corning Co., Ltd.) is used as a leveling agent, for example, a silicone leveling agent.

Ultraviolet Absorber:

In the present invention, an ultraviolet absorber (hereinafter, also denoted as a UV absorber) may be added for the purpose of prevention of deterioration by sun light or ultraviolet rays. Preferably, at least one of constituent layers provided on the resin substrate contains an ultraviolet absorber.

Ultraviolet absorbers include benzophenone type, benzotriazole type, phenyl salicylate type and triazine type ones.

Specific examples of a benzophenone type ultraviolet absorber include 2,4-dihydroxy-benzophenone, 2-hydroxy-4-methoxy-benzophenone, 2-hydroxy-4-n-octoxy-benzophenone, 2-hydroxy-4-dodecyloxy-benzophenone, 2-hydroxy-4-octadecyloxy-benzophenone, 2,2'˝dihydroxy-4-methoxy-benzophenone, 2,2'-dihydroxy-4,4'-dimethoxy-benzophenone, and 2,2',4,4'-tetrahydroxy-benzophenone.

Specific examples of a benzotriazole type ultraviolet absorber include 2-(2'-hydroxy-5-methylphenyl)benzotriazole, 2-(2'-hydroxy-3',5'-di-t-butylphenyl)benzotriazole, and 2-(2'-hydroxy-3'-t-butyl-5'-methylphenyl)benzotriazole.

Specific examples of a phenyl salicylate type ultraviolet absorber include phenyl salicylate, and 2-4-t-butylphenyl-3,5-di-t-butyl-4-hydroxybenzoate. Specific examples of a hindered amine type ultraviolet absorber include bis(2,2,6,6-tetramethylpiperidine-4-yl)sebacate.

Specific examples of a triazine type ultraviolet absorber include 2,4-diphenyl-6-(2-hydroxy-4-methoxyphenyl)-1,3,5-triazine, 2,4-diphenyl-6-(2-hydroxy-4-ethoxyphenyl)-1,3,5-triazine, diphenyl-(2-hydroxy-4-propoxyphenyl)-1,3,5-triazine, 2,4-diphenyl-(2-hydroxy-4-butoxyphenyl)-1,3,5-triazine, 2,4-diphenyl-6-(2-hydroxy-4-butoxyphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, and 2,4-diphenyl-6-(2-hydroxy-4-benzyloxyphenyl)-1,3,5-triazine.

Besides the forgoing ultraviolet absorbers, a compound having a function of transforming an energy retained by an ultraviolet ray into a vibration energy within a molecule and liberating the vibration energy in the form of heat energy. There is cited an ultraviolet, absorber which comes into effect in combined use with an antioxidant or there may be concurrently used a colorant and a light stabilizer which is called a quencher and acts in such a manner as a light energy converting agent. When using an ultraviolet absorber, as described above, it is necessary to choose an ultraviolet absorber whose light absorption wavelength does not overlap with the effective wavelength of a photopolymerization initiator.

When using conventional ultraviolet inhibitors, it is effective to use a photopolymerization initiator capable of generating a radical upon exposure to light.

An ultraviolet absorber is used preferably in an amount of from 0.1 to 20% by mass, more preferably from 1 to 15% by mass, and still more preferably from 3 to 10% by mass. An amount of more than 20% by mass results in deteriorated adhesion property and an amount of less than 0.1% by mass leads to reduced improvement effect in weather resistance.

Total Thickness of Film Mirror:

The total thickness of the film mirror related to the present invention is preferably from 75 to 250 μm, more preferably from 90 to 230 μm, and still more preferably from 100 to 220 nm in terms of prevention of deflection, specular reflectance and handling characteristics of the mirror.

Reflection Device for Solar Power Generation.

The film mirror of the present invention is preferably usable with the object of collecting solar light. A single body of a film mirror is usable as a solar condenser mirror, but is used preferably as a reflection device for solar electric power generation in which said film mirror is adhered onto a metal substrate via an adherent layer which is coated on the surface of the resin surface and onto the opposite side to the silver reflection layer.

When used as a reflection device for solar power generation, the shape of the reflection device is in the form of a gutter (semi-cylindrical form), and a cylindrical member internally containing fluid is provided in the central portion of a semi-circle and solar light is focused onto the cylindrical member, whereby the internal fluid is heated and its heat energy is converted to electric power. Alternatively, planar reflection devices are provided onto plural portions, and solar light reflected in the individual reflection devices is focused onto a single sheet of a reflection mirror (central reflection mirror) and the heat energy obtained through reflection by the reflection mirror is converted in the electric power generation section to perform electric power generation. Specifically in the latter embodiment, a reflection device used therein requires a high specula reflectivity, so that the film mirror of the present invention is specifically preferable.

Adherent Layer:

An adherent layer is not specifically limited and can employ any one of, for example, a dry-laminating agent, a wet-laminating agent, an adhering agent, a heat-sealing agent, and a hot-melting agent.

There may be used, for example, a polyester resin, a urethane resin, a polyvinyl acetate resin, an acryl resin, and a nitrile rubber.

The laminating method is not specifically limited and, for example, it is preferable to perform continuous lamination by a rolling method in terms of economic feasibility and productivity.

Usually, the thickness of an adherent layer is preferably within a range of 1 to 50 μm in terms of adherence effect and drying speed.

The other substrate to be laminated to the film mirror of the present invention may be any one which is capable of providing protective property for a silver reflection layer, and there are usable, for example, a plastic film or sheet such as an acryl film or sheet, a polycarbonate film or sheet, a polyarylate film or sheet, a polyethylene naphthalate film or sheet, a polyethylene terephthalate film or sheet, or fluorinated film; or resin film or sheet in which a mixture of the foregoing resins is coated or a surface treatment is performed by metal vapor deposition.

The thickness of a laminated film or sheet is not specifically limited but preferably within a range of 12 to 25 μm.

Before the other substrate is laminated onto the film mirror of the present invention, the other substrate may be provided with concave-convex portions and then laminated, or after being laminated, it may be molded so as to form concave-convex portions. Alternatively, there may be simultaneously conducted lamination and molding to form concave-convex portions.

Metal Substrate:

The metal substrate of the solar condenser mirror related to the present invention can employ metal materials exhibiting high heat conductivity, such as a steel plate, a copper plate, an aluminum plate, an aluminum-plated steel plate, an aluminum alloy-plated steel plate, a copper-plated steel plate, a tin-plated steel plate, a chromium-plated steel plate, and a stainless steel plate.

In the present invention, plated steel plates, a stainless steel plate and an aluminum plate, which are excellent in corrosion resistance, are preferable.

EXAMPLES

The present invention will be further described with reference to examples and comparative examples.

(I) In the following, there will be described cases in which at least an upper adjacent layer contains a binder and a corrosion inhibitor for silver.

Reference Example 1

There was used, as a substrate, a biaxially stretched polyester film (polyethylene terephthalate film, thickness: 100 μm). A resin mixture in which a polyester resin (polyester SP-181, produced by Nippon Gosei Kagaku Co., Ltd.), a melamine resin (SUPER BECHAMINE J-820, produced by DIC Co., Ltd.), a TDI type isocyanate (2,4-tolylenediisocyanate), and an HDMI type isocyanate (1,6-hexamethylene diisocyanate) were mixed so that the resin solid content ratio was 20:1:1:2 and the solid concentration was 10%, was coated onto the substrate by a gravure coating method to form a 0.1 μm thick adhesive layer. On the adhesive layer was formed an 80 nm thick silver reflection layer by a vacuum deposition method. A resin mixture in which a polyester resin and a TDI type isocyanate (tolylenediisocyanate) were mixed so that the solid content ratio was 10:2, coated onto the silver reflection layer to form a 0.1 μm thick upper adjacent layer. Further, a thioether {2,4-bis[(octylthio)methyl]-o-crezol} as a corrosion inhibitor was contained in the upper adjacent layer at an amount of 0.3 g/m$^2$. The thus prepared sample was denoted as a sample of Reference Example 1.

Example 1

There was used, as a substrate, a biaxially stretched polyester film (polyethylene terephthalate film, thickness: 100 μm). To a resin mixture in which the foregoing polyester resin, the foregoing melamine resin, the foregoing TDI type isocyanate (2,4-tolylenediisocyanate), and the HDMI type isocyanate (1,6-hexamethylene diisocyanate) were mixed so that the resin solid content ratio was 20:1:1:2 was added an imidazole compound (5,6-dimethylbenzimidazole) as a corrosion inhibitor so that the amount after coating was 0.2 g/m$^2$. The foregoing mixture was coated on the substrate by a gravure coating method to form a 0.1 μm thick adhesive layer. On the adhesive layer was formed an 80 nm thick silver reflection layer by a vacuum deposition method. To a mixture in which the polyester resin and the foregoing TDI isocyanate were mixed in a solid content ratio of 10:2 was added an imidazole compound (5,6-dimethylbenzimidazole) so that the amount after coating was 0.3 g/m$^2$, and coated on the silver reflection layer by a gravure coating method to form a 0.1 μm thick upper adjacent layer, whereby a sample of Example 1 was obtained.

Example 2

A sample of Example 2 was prepared in the same manner as Example 1, except that, in place of the imidazole compound of Example 1, a thiadiazole compound (1,3,4-thiadiazole-2,5-dithiol) was added in the same amount as Example 1 to each of the adhesive layer and the upper adjacent layer.

Example 3

A sample of Example 3 was prepared in the same manner as Example 1, except that, in place of the imidazole compound of Example 1, a triazole compound (benztriazole) was added in the same amount as Example 1 to each of the adhesive layer and the upper adjacent layer.

Example 4

On the outer side of the outer adjacent layer of the sample of Example 3 was coated, by a bar coating method, a dibutyl ether solution containing perhydropolysilazane in an amount of 3% so that the thickness after being dried was 100 nm, subjected to natural drying over 3 minutes and further annealed in an oven at 90° C. over 30 minutes to form a gas barrier layer, whereby a sample of Example 4 was prepared.

Preparation of Solar Condenser Mirror:

Each of the foregoing samples was adhered via a 3 μm thick adherent layer onto a 0.1 mm thick, 4 cm long×5 cm wide stainless steel (SUS 304) plate to prepare a solar condenser mirror.

Evaluation

Each of the thus prepared solar condenser mirrors was measured with respect to specular reflectance and degree of layer lifting, caused by insufficient layer adhesion.

Measurement of Specular Reflectance:

A specular reflectance at a reflection angle of 5° was measured by using a spectrophotometer, modified UV 265 (produced by Shimazu Seisakusho) which was equipped with an integrating sphere attachment and adjusted so that the incident angle of incident light was 5°. Evaluation was made by measurement of an average reflectance within a range of 350 nm to 700 nm.

Inspection of Layer Lifting:

Using a laser microscope (OLS 4000, produced by Olympus Kogaku Kogyo Co., Ltd.), surface roughness was measured to determine the degree of layer lifting. High-temperature and High-humidity Test of Specular Reflectance and Layer Lifting:

After being allowed to stand under condition of a temperature of 85° C. and a humidity of 85% RH over 30 days, film mirrors were each measured with respect to specular reflectance in a similar manner to the foregoing measurement of specular reflectance of light to determine the rate of decrease in specular reflectance. The criteria for evaluation are shown below:

Specular Reflectance:

5: A rate of decrease in specular reflectance of less than 5%,

4: A rate of decrease in specular reflectance of not less than 5% and less than 10%, 3: A rate of decrease in specular reflectance of not less than 10% and less than 15%, 2: A rate of decrease in specular reflectance of not less than 15% and less than 20%, 1: A rate of decrease in specular reflectance of not less than 20%.

Degree of Layer Lifting:

A: Surface roughness Ra: less than 0.1 μm,

B: Surface roughness of not less than 0.1 μm and less than 0.2 μm,

C: Surface roughness of not less than 0.2 μm and less than 0.5 μm,

D: Surface roughness of more than 0.5 μm.

TABLE 1

| Example/ Reference Example No. | Corrosion Inhibitor | Melting Point | Storage Test (85° C., 85% RH) | | | |
|---|---|---|---|---|---|---|
| | | | 168 hr. | | 1000 hr. | |
| | | | Specular Reflectance | Layer Lifting | Specular Reflectance | Layer Lifting |
| Example 1 | imidazole compound | 90° C. | 5 | B | 5 | B |
| Example 2 | thiadiazole compound | 162° C. | 5 | B | 5 | B |
| Example 3 | triazole compound | 98° C. | 5 | B | 5 | B |
| Example 4 | triazole compound | 98° C. | 5 | A | 5 | A |
| Reference Example 1 | thioether compound | less than 25° C. | 3 | C | 3 | C | imidazole compound: 5,6-dimethylbenzimidazole
thiadiazole compound: 1,3,4-thiadiazole-2,5-dithiol
triazole compound: benzotriazole
thioether compound: 2,4-bis[(octylthio)methyl]-o-crezole As is apparent from the evaluation results shown in Table 1, it was proved that examples related to the present invention were superior in various characteristics, compared to the reference example. Specifically, it was proved that, according to the foregoing means of the present invention, there could be provided a film mirror in which a decrease in specular reflectance, caused by layer lifting of the barrier layer adjacent to the anti-corrosion layer or sublayer was inhibited and which was lightweight and flexible, could be produced at low cost, could have an enlarged surface area, could be produced on a large scale, exhibited excellent light stability and weather resistance, and exhibited good specular reflectance to solar light, and there could also be provided a production method of the film mirror and a reflection device for solar power generation.

(II) In the following, there will be described cases in which both of an adhesive layer and an upper adjacent layer contain a binder and a corrosion inhibitor for silver.

Comparison Example 1

There was used, as a substrate, a biaxially stretched polyester film (polyethylene terephthalate film, thickness: 100 μm). A resin mixture in which a polyester resin (polyester SP-181, produced by Nippon Gosei Kagaku Co., Ltd.), a melamine resin (SUPER BECHAMINE J-820, produced by DIC Co., Ltd.), a TDI type isocyanate (2,4-tolylenediisocyanate), and an HDMI type isocyanate (1,6-hexamethylene diisocyanate) were mixed so that the resin solid content ratio was 20:1:1:2 and the solid concentration was 10%, was coated on the substrate by a gravure coating method to form a 0.1 μm thick adhesive layer. On the adhesive layer was formed an 80 nm thick silver reflection layer by a vacuum deposition method. A resin mixture in which a polyester resin and a TDI type isocyanate (tolylenediisocyanate) were mixed so that the solid content ratio was 10:2, coated on the silver reflection to form a 0.1 μm thick upper adjacent layer. There was obtained comparison example 1.

Example 1

There was used, as a substrate, a biaxially stretched polyester film (polyethylene terephthalate film, thickness: 100 μm). To a resin mixture, in which the foregoing polyester resin, the foregoing melamine resin, the foregoing TDI type isocyanate (2,4-tolylenediisocyanate), and the HDMI type isocyanate (1,6-hexamethylene diisocyanate) were mixed so that the resin solid content ratio was 20:1:1:2, was added glycol dimercaptoacetate (corrosion inhibitor A) so that the amount after being coated was 0.2 g/m$^2$. The foregoing mixture was coated on the substrate by a gravure coating method to form a 0.1 μm thick adhesive layer. On the adhesive layer was formed an 80 nm thick silver reflection layer by a vacuum deposition method. To a mixture in which a polyester resin and the foregoing TDI isocyanate were mixed in a solid content ratio of 10:2 was added glycol dimercaptoacetate (corrosion inhibitor A) so that the amount after being coated was 0.3 g/m$^2$, and coated on the silver reflection layer by a gravure coating method to form a 0.1 μm thick upper adjacent layer, whereby a sample of Example 1 was obtained.

Example 2

A sample of Example 2 was prepared in the same manner as Example 1, except that, in place of glycol dimercaptoacetate of Example 1, 2-mercaptobenzothiazole (corrosion inhibitor B) was added in the same amount as in Example 1 to each of the adhesive layer and the upper adjacent layer.

Example 3

A sample of Example 3 was prepared in the same manner as Example 1, except that, in place of glycol dimercaptoacetate of Example 1, 2,2' methylenebis(4,6-di-t-butylphenyl) octylphosphite (corrosion inhibitor C) was added to the adhesive layer and the upper adjacent layer in amounts of 0.3 g/m$^2$ and 0.5 g/m$^2$, respectively.

Example 4

A sample of Example 4 was prepared in the same manner as Example 3, except that glycol dimercaptoacetate was added to the upper adjacent layer in an amount of 0.3 g/m$^2$ after coated.

Example 5

On the outer side of the outer adjacent layer of the sample of Example 4 was coated, by a bar coating method, a solution of dibutyl ether (NL 120, produced by Clariant Co.) containing perhydropolysilazane in an amount of 3% so that the thickness after being dried was 100 nm, subjected to natural drying over 3 minutes and further annealed in an oven at 90° C. over 30 minutes to form a gas barrier layer, whereby a sample of Example 5 was prepared.

Example 6

A commercially available hard coat agent [OPSTAR (trade name) Z7534, produced by JSR was diluted with methyl ethyl ketone so that the solid content was 50% by mass, and acrylic particles having an average particle size of 1.5 μm [CHEMISNOW (trade name) MX series, produced by Soken Kagaku Co., Ltd.] were further added thereto in an amount of 1% by mass of the solid content of the hard coat agent, whereby a paint used for an anti-scratching layer was prepared. The paint was coated on the outer side of the gas barrier layer of the sample of Example 5, dried at 80° C. and then exposed to ultraviolet rays at 1.0 J/cm$^2$ to be cured, whereby a 6 μm thick anti-scratching layer was provided.

Example 7

To the paint for the anti-scratching layer used in Example 6 was added 2,40dihydroxy-benzophenone so that the amount after coating was 0.7 g/m$^2$. Using this paint, a scratch resistant layer was provided in the same manner as in Example 6, whereby a sample of Example 7 was prepared.

Example 8

A sample of Example 8 was prepared in the same manner as in Example 7, except that a polyester film used in Example 6 was replaced by a 175 μm thick polyester film.

Examples 9-11

Samples of Example 9-11 were prepared in the same manner as in Example 8, except that the corrosion inhibitor contained in the upper adjacent layer was replaced by each of the following corrosion inhibitors (D) to (F):
Corrosion inhibitor (D): 5,6-Dimethylbenzimidazole,
Corrosion inhibitor (E): 1,3,4-Thiadiazole-2,5-dithiol,
Corrosion inhibitor (F): Benztriazole.
Preparation of Solar Condenser Mirror:
Each of the foregoing samples was adhered via a 3 μm thick adherent layer onto a 0.1 mm thick, 4 cm long×5 cm wide stainless steel (SUS 304) plate to prepare a solar condenser mirror.
Evaluation
Each of the thus prepared solar condenser mirrors was measured with respect to specular reflectance, weather resistance and light stability.
Measurement of Specular Reflectance:
The specular reflectance at a reflection angle of 5° was measured by using a spectrophotometer, modified UV 265 (produced by Shimazu Seisakusho) which was equipped with an integrating sphere attachment and adjusted so that the incident angle of incident light was 5°. Evaluation was made by measurement of an average reflectance over the range of 350 nm to 700 nm.

Weather Resistance Test of Specular Reflectance:

After being allowed to stand under condition of a temperature of 85° C. and a humidity of 85% RH over 30 days, film mirrors were each measured with respect to specular reflectance in the same manner as in the foregoing measurement of light reflectance. The rate of decrease in specular reflectance between before and after the test for weather resistance (or weather test) was determined from the ratio of specular reflectance of a film mirror after accelerated aging to that before accelerated aging. Evaluation criteria of the weather test are shown below:

5: A rate of decrease in specular reflectance of less than 5%,
4: A rate of decrease in specular reflectance of not less than 5% and less than 10%,
3: A rate of decrease in specular reflectance of not less than 10% and less than 15%,
2: A rate of decrease in specular reflectance of not less than 15% and less than 20%,
1: A rate of decrease in specular reflectance of not less than 20%.

Light Stability Test of Specular Reflectance:

Obtained samples were exposed to ultraviolet rays over 7 days under an environment of 65° C. by using EYE Super UV Tester (produced by Iwasaki Denk Co., Ltd.) and then measured with respect to specular reflectance to determine the rate of decrease in specular reflectance between before and after exposure to ultraviolet rays. Evaluation criteria of light stability test are shown below:

5: A rate of decrease in specular reflectance of less than 5%,
4: A rate of decrease in specular reflectance of not less than 5% and less than 10%,
3: A rate of decrease in specular reflectance of not less than 10% and less than 15%,
2: A rate of decrease in specular reflectance of not less than 15% and less than 20%,
1: A rate of decrease in specular reflectance of not less than 20%.

Pencil Harness Test:

Based on JIS K 5400, samples were each measured with respect to pencil hardness at an inclination of 45° under a load of 1 kg. Measurement results are shown in Table 2.

Yellowing of Solar Condenser Mirror:

Obtained samples were exposed to ultraviolet rays over 7 days under an environment of 65° C. by using EYE Super UV Tester (produced by Iwasaki Denk Co., Ltd.) and visually observed with respect to yellowing.

A: No color difference was visually observed,
B: Slight color difference was visually observed,
C: Marked color difference was observed.

Contents of the thus obtained film mirrors are shown in Table 2 and their evaluation results are shown in Table 3.

TABLE 3

| Example/Comparison No. | Specular Reflectance % | Weather Resistance | Light Stability | Pencil Hardness | Yellowing |
|---|---|---|---|---|---|
| Comparison 1 | 94 | 2 | 1 | B | B |
| Example 1 | 94 | 4 | 4 | B | B |
| Example 2 | 93 | 4 | 4 | B | B |
| Example 3 | 93 | 3 | 5 | B | B |
| Example 4 | 94 | 4 | 5 | B | B |
| Example 5 | 94 | 5 | 5 | 1H | B |
| Example 6 | 94 | 5 | 5 | 3H | B |
| Example 7 | 94 | 5 | 5 | 3H | A |
| Example 8 | 97 | 5 | 5 | 3H | A |
| Example 9 | 97 | 5 | 5 | 3H | A |
| Example 10 | 96 | 5 | 5 | 3H | A |
| Example 11 | 97 | 5 | 5 | 4H | A |

As is apparent from the evaluation results shown in Table 3, it was proved that examples related to the present invention were superior in various characteristics, compared to the comparison example. Specifically, it was proved that, according to the foregoing means of the present invention, there could be provided a film mirror in which a lowering in specular reflectance, caused by deterioration was inhibited and which was lightweight and flexible, could be produced at low cost, could have an enlarged surface area, could be produced on a large scale, exhibits excellent light stability and weather resistance, and exhibited good specular reflectance to solar light, and there could also be provided a production method of the film mirror and a reflection device for solar power generation.

What is claimed is:

1. A film mirror comprising at least an adhesive layer, a silver reflection layer and an upper adjacent layer as constituent layers provided on a resin substrate sequentially in this order, wherein at least the upper adjacent layer contains a binder and a corrosion inhibitor for silver, wherein the corrosion inhibitor is a corrosion inhibitor which is adsorptive to silver, wherein the silver reflection layer reflects solar light including visible light, and wherein the mirror has a specular reflectance of visible light of 93% or more.

2. The film mirror, as claimed in claim 1, wherein the corrosion inhibitor is a heterocyclic compound which exhibits a melting point of not less than 25° C.

3. The film mirror, as claimed in claim 2, wherein the adhesive layer contains an antioxidant.

TABLE 2

| Example/Comparison No. | Thickness of Substrate | Adhesive Layer | Upper Adjacent Layer | Gas Barrier Layer | Anti-scratching Layer | UV Absorber |
|---|---|---|---|---|---|---|
| Comparison 1 | 100 μm | — | — | — | — | — |
| Example 1 | 100 μm | Corrosion Inhibitor (A) | Corrosion Inhibitor (A) | — | — | — |
| Example 2 | 100 μm | Corrosion Inhibitor (B) | Corrosion Inhibitor (B) | — | — | — |
| Example 3 | 100 μm | Corrosion Inhibitor (C) | Corrosion Inhibitor (C) | — | — | — |
| Example 4 | 100 μm | Corrosion Inhibitor (C) | Corrosion Inhibitor (A) | — | — | — |
| Example 5 | 100 μm | Corrosion Inhibitor (C) | Corrosion Inhibitor (A) | Yes | — | — |
| Example 6 | 100 μm | Corrosion Inhibitor (C) | Corrosion Inhibitor (A) | Yes | Yes | — |
| Example 7 | 100 μm | Corrosion Inhibitor (C) | Corrosion Inhibitor (A) | Yes | Yes | Yes |
| Example 8 | 175 μm | Corrosion Inhibitor (C) | Corrosion Inhibitor (A) | Yes | Yes | Yes |
| Example 9 | 175 μm | Corrosion Inhibitor (C) | Corrosion Inhibitor (D) | Yes | Yes | Yes |
| Example 10 | 175 μm | Corrosion Inhibitor (C) | Corrosion Inhibitor (E) | Yes | Yes | Yes |
| Example 11 | 175 μm | Corrosion Inhibitor (C) | Corrosion Inhibitor (F) | Yes | Yes | Yes |

4. The film mirror, as claimed in claim 1, wherein the adhesive layer contains a binder and a corrosion inhibitor for silver.

5. The film mirror, as claimed in claim wherein the corrosion inhibitor in the adhesive layer is an antioxidant.

6. The film mirror, as claimed in claim 1, wherein a gas barrier layer is provided on an upper side of the upper adjacent layer.

7. The film mirror, as claimed in claim 1, wherein a scratch resistant layer is provided as an outermost layer of the film mirror.

8. The film mirror, as claimed in claim 1, wherein any one of the constituent layers provided on the resin substrate contains an ultraviolet absorbent.

9. The film mirror, as claimed in claim 1, wherein a thickness of a whole of layers including the resin substrate is within a range of 75 to 250 μm.

10. A method of producing a film mirror, wherein the film mirror is as claimed in claim 1, and the method comprises a step of forming the silver reflection layer by vapor deposition.

11. A reflection device for solar power generation using the film mirror, as claimed in claim 1, wherein the film mirror is adhered to a metal substrate via an adherent layer which is provided on a surface of the resin substrate on the side opposite from the silver reflection layer.

12. A film mirror, as claimed in claim 1,
   wherein the upper adjacent layer comprises a polyester resin or an acrylic resin which is hardened with an isocyanate compound.

\* \* \* \* \*